(12) United States Patent
Minami et al.

(10) Patent No.: US 10,791,179 B2
(45) Date of Patent: Sep. 29, 2020

(54) REMOTE MANAGEMENT SYSTEM FOR SPECIFYING A PROTOCOL TO BE USED BETWEEN AN INTERMEDIARY DEVICE AND A DEVICE IN A REMOTE SYSTEM

(71) Applicants: Kohichiroh Minami, Kanagawa (JP); Kenji Yamada, Tokyo (JP)

(72) Inventors: Kohichiroh Minami, Kanagawa (JP); Kenji Yamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 158 days.

(21) Appl. No.: 15/917,894

(22) Filed: Mar. 12, 2018

(65) Prior Publication Data

US 2018/0270313 A1 Sep. 20, 2018

(30) Foreign Application Priority Data

Mar. 17, 2017 (JP) .................. 2017-053750

(51) Int. Cl.
 H04L 29/08 (2006.01)
 H04L 29/06 (2006.01)
 H04L 12/28 (2006.01)
 H04L 12/24 (2006.01)
(52) U.S. Cl.
 CPC .......... *H04L 67/141* (2013.01); *H04L 12/28* (2013.01); *H04L 41/00* (2013.01); *H04L 63/02* (2013.01); *H04L 63/029* (2013.01); *H04L 67/10* (2013.01); *H04L 67/32* (2013.01); *H04L 69/18* (2013.01)

(58) Field of Classification Search
 CPC ... H04L 29/06088; H04L 63/02; H04L 69/18; H04L 29/06163; H04L 67/141
 See application file for complete search history.

(56) References Cited

U.S. PATENT DOCUMENTS

| 2004/0205207 | A1 | 10/2004 | Motoyama |
| 2007/0013936 | A1* | 1/2007 | Ishimoto ............... H04L 41/022 358/1.13 |
| 2008/0075096 | A1* | 3/2008 | Wagner ............. H04L 29/12509 370/401 |
| 2009/0187668 | A1* | 7/2009 | Arendt ................ G06F 11/2023 709/230 |

(Continued)

FOREIGN PATENT DOCUMENTS

| JP | 2004-259259 | 9/2004 |
| JP | 2009-032277 | 2/2009 |
| JP | 2014-179022 | 9/2014 |

*Primary Examiner* — Jeong S Park
(74) *Attorney, Agent, or Firm* — Oblon, McClelland, Maier & Neustadt, L.L.P.

(57) ABSTRACT

A remote management system is configured so that a management system remote manages a device through an intermediary device. The management system includes a protocol specifying unit configured to specify a protocol to establish connection between the intermediary device and the device, a priority specifying unit configured to specify priority order of a plurality of the protocols, and a request generating unit configured to generate a request including the protocol and the priority order. The intermediary device includes a communication control unit configured to establish connection between the intermediary device and the device by using the protocols included in the request in descending order of the priority order.

9 Claims, 12 Drawing Sheets

(56) References Cited

U.S. PATENT DOCUMENTS

2009/0307570 A1* 12/2009 Hirata .................... G06Q 10/06
 715/200
2010/0042737 A1*  2/2010 Fujimoto ........... H04N 1/00214
 709/230
2010/0198976 A1*  8/2010 Kawai ................. H04L 41/0213
 709/230
2013/0283377 A1* 10/2013 Das ..................... H04L 63/1441
 726/23

* cited by examiner

FIG.7

```
{
"webSocketType":"GATEWAY_CMD_REQ",
"commands":[
    {
    "commandid":"12345678"
    "gatewayCommandType":"DEVICE_ACCESS",
    "deviceAccess":{
        "sequence":1,
        "deviceid":"112233",
        "request":{
            "protocol":[            "HTTP"(1),
                         65 ⟶      "HTTPS"(2),    ⟵ 66
                                   "FTP"(3)
            ],
            "method":"GET",
            "secure":false,
            "port":80,
            "urlPah":"/debug_log",
            "headers":null,
            "queryStrings":null,
            "messageBody":null,
            "responseValue":null,
            "option":{
                uploadResource:{
                    "method":"PUT",
                    "url":"https://dev.cdsg.adr.ricoh.com/sicg/v1/files/20160722001010"
                }
            }
        }
    }
  ]
}
```

```
{
"webSocketType":"GATEWAY_CMD_REQ",
"commands":[
    {
    "commandid":"12345678",
    "gatewayCommandType":"DEVICE_ACCESS",
    "deviceAccess":{
        "sequence":1,
        "deviceid":"12345678",
        "request":{
            "protocol":[         ──65        "HTTP"(1),
                                              "HTTPS"(2),  ──66
                                              "FTP"(3)
            ],
            "method":"PUT",
            "secure":false,
            "port":80,
            "urlPah":"/upload",
            "headers":[
                {
                "key":"Content-Type",
                "value":"application/octet-stream"
                }
            ],
            "queryStrings":null,
            "messageBody":null,
            "responseValue":null,
            "option":{
                downloadResource:{
                    "method":"GET",
                    "url":"https://dev.cdsg.adr.ricoh.com/sicg/v1/files/20160722001010"
                }
            }
        }
    }
    }
]
}
```
⎯72

REMOTE MANAGEMENT SYSTEM FOR SPECIFYING A PROTOCOL TO BE USED BETWEEN AN INTERMEDIARY DEVICE AND A DEVICE IN A REMOTE SYSTEM

CROSS-REFERENCE TO RELATED APPLICATIONS

The present application claims priority under 35 U.S.C. § 119 to Japanese Patent Application No. 2017-053750, filed on Mar. 17, 2017. The contents of which are incorporated herein by reference in their entirety.

BACKGROUND OF THE INVENTION

1. Field of the Invention

The present invention relates to a remote management system, an intermediary device, and a remote management method.

2. Description of the Related Art

There has been a system that remotely manages a device that is connected to a local area network (LAN) protected by a firewall by a management system located outside the firewall. In this kind of system, an intermediary device that intermediates communication between the management system and the device is used. The intermediary device is connected to the LAN, and establishes connection with the device based on a request received from the management system through the firewall.

For example, a configuration of a relay device that relays communication between a management apparatus and a device connecting apparatus has been disclosed in which the device connecting apparatus and a device can communicate with each other using a first communication protocol of constant connection, the device connecting apparatus and the relay device can communicate with each other using a second communication protocol of request-response, and the management apparatus and the relay device can communicate with each other using the second communication protocol (Japanese Laid-open Patent Publication No. 2014-179022).

In conventional systems, connection can only be established by a protocol that has been specified between an intermediary device (relay device) and a device to be managed. However, the protocol to establish connection between the intermediary device and the device can be changed according to a situation. Therefore, in a conventional system, there is a possibility that connection between an intermediary device and a device is not established after a request is transmitted from a management system and the request is left unprocessed. Such a phenomenon can cause deterioration of stability of a remote management system.

The present invention is achieved in view of the above problem, and it is an object thereof to improve the stability of a remote management system.

SUMMARY OF THE INVENTION

Brief Description of the Drawings

FIG. 7 illustrates a management request according to the first example of the first embodiment;

FIG. 8 illustrates a management request according to the second example of the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
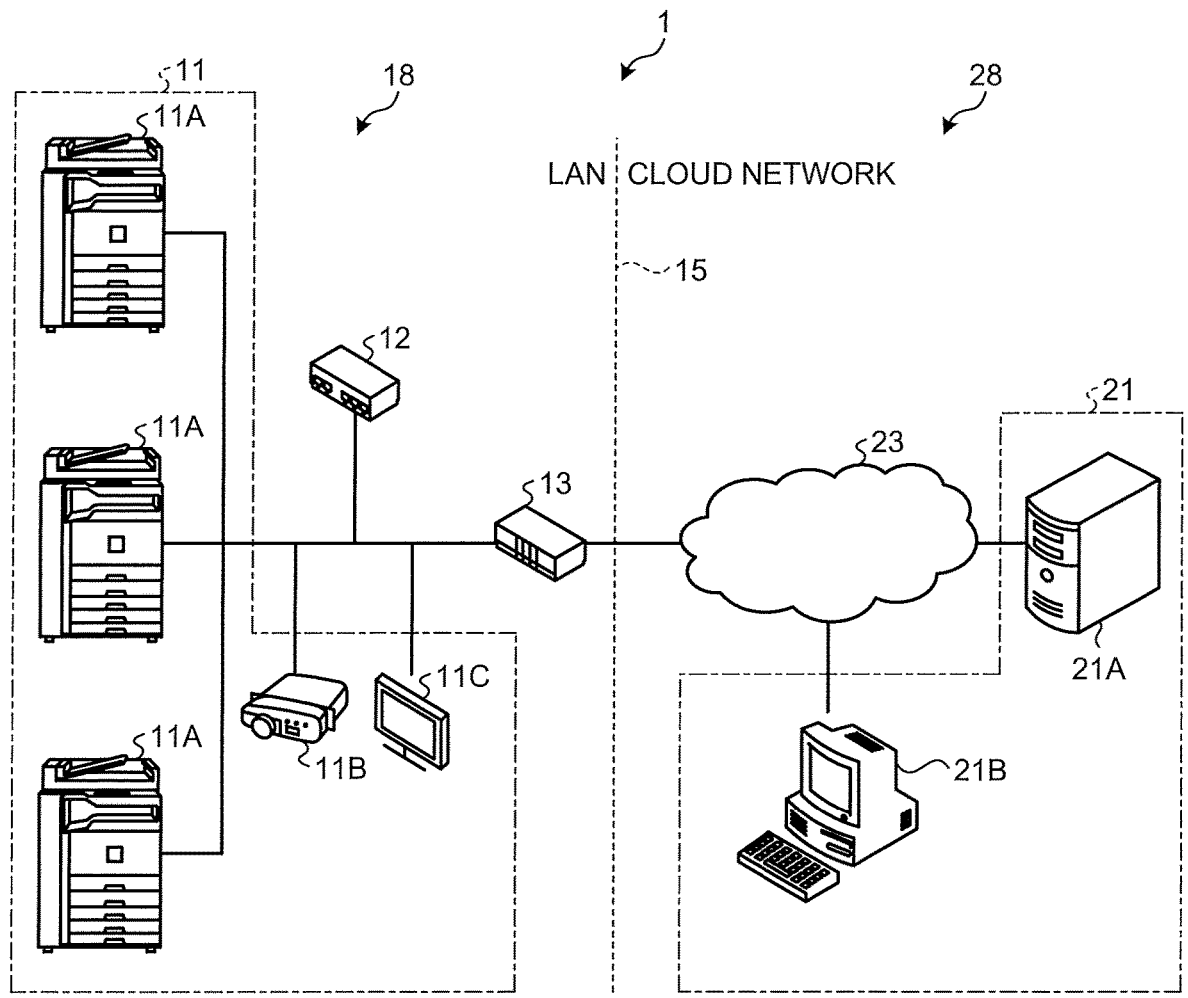
FIG. 1 illustrates a configuration of a remote management system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

Embodiments of a display device are explained in detail below referring to the accompanying drawings. The following embodiments are not intended to limit the present invention, and components in the following embodiments include modifications that can be easily thought of by those skilled in the art, that are substantially identical thereto, and that are within a range of so-called equivalents. Various omissions, replacements, changes, and combinations of the components can be made without departing from the gist of the following embodiments.

First Embodiment

FIG. 1 illustrates a configuration of a remote management system 1 according to a first embodiment. The remote management system 1 according to the present embodiment includes multiple devices 11 (device), an intermediary device 12, and a management system 21. The management system 21 remotely manages the device 11 through the intermediary device 12.

In this example, multiple units of multifunction peripheral (MFP) 11A, a projector 11B, and an electronic whiteboard 11C are taken as an example of the device 11 to be a subject of remote management. The device 11 and the intermediary device 12 are connected to a LAN 18 that is protected by a firewall 15. The device 11 and the intermediary device 12 can be connected to the Internet 23 outside the firewall 15, through a router 13.

The management system 21 is connected to a cloud network 28 outside the firewall 15. The management system 21 of this example includes a server 21A and a PC 21B. The server 21A is a computer that provides a function necessary for remote management of the device 11, and includes a mass storage, a central processing unit (CPU), a storage device that stores a program to control the CPU, and the like. The PC 21B is a computer that accepts an operation made by a user (administrator of the device 11), and can communicate with the server 21A through the Internet 23. The server 21A has a cloud application installed therein to implement processing necessary for the remote management of the device 11. The PC 21B has a PC application installed therein to implement processing necessary for the remote management of the device 11. In this example, the PC 21B is used as a user interface when performing the remote management. The management system 21 is not necessarily required to be constituted of multiple units of hardware, but can be a single unit of information processing apparatus that provides an input device to accept an input operation by a user and a graphical user interface (GUI).

Figure 2:
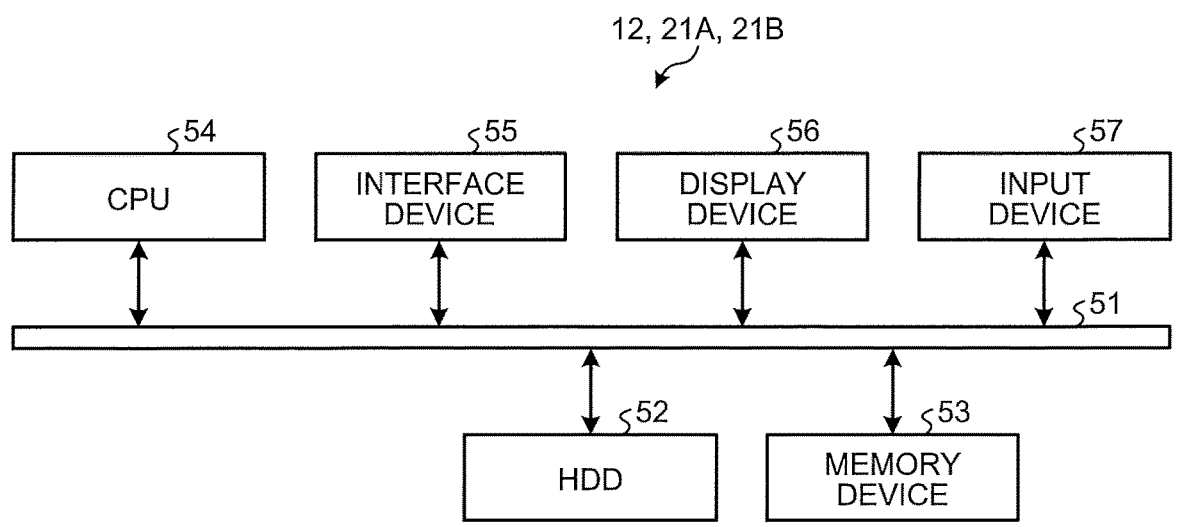
FIG. 2 is a block diagram illustrating a hardware configuration of an intermediary device, a server, and a personal computer (PC) according to the first embodiment.

FIG. 2 is a block diagram illustrating a hardware configuration of the intermediary device 12, the server 21A, and the PC 21B according to the first embodiment. Each of the intermediary device 12, the server 21A, and the PC 21B includes a hard disk drive (HDD) 52, a memory device 53, a CPU 54, an interface device 55, a display device 56, and an input device 57 that are connected to each other through a bus 51. A program that implements respective functions of the intermediary device 12, the server 21A, and the PC 21B is stored, for example, in the HDD 52. The HDD 52 stores, in addition to the program, a file, data, and the like necessary for the respective processing. The memory device 53 stores the program that is read from the HDD 52 when receiving an instruction to start the program, and functions as a work area of the CPU 54. The CPU 54 performs arithmetic processing, control processing, and the like in the respective devices of the intermediary device 12, the server 21A, and the PC 21B according to the program stored in the memory device 53. The interface device 55 is a device that is connected to a network, and that establishes communication with another device using a predetermined protocol. The display device 56 is a device that displays a GUI that is used when the respective functions in the intermediary device 12, the server 21A, and the PC 21B is performed, and the like, and is a display or the like. The input device 57 is a device that accepts an input operation made by a user and is, for example, a keyboard, a pointing device (mouse, touch panel, etc.), and the like. Note that the display device 56 and the input device 57 might not be included in the intermediary device 12 and the server 21A.

Figure 3:
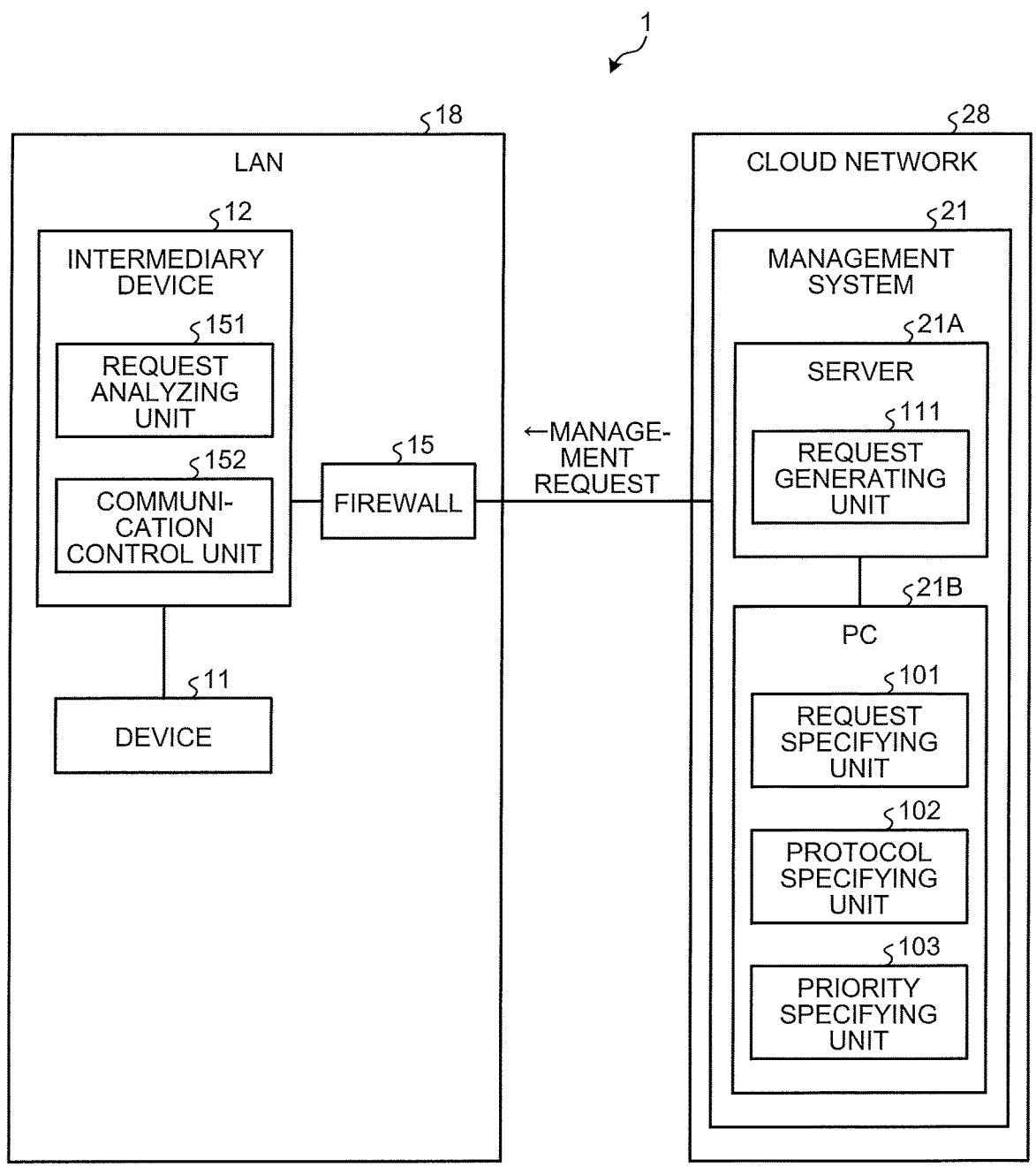
FIG. 3 is a block diagram illustrating a functional configuration of the remote management system according to the first embodiment.

FIG. 3 is a block diagram illustrating a functional configuration of the remote management system 1 according to the first embodiment. In the present embodiment, the management system 21 includes a request specifying unit 101, a protocol specifying unit 102, a priority specifying unit 103, and a request generating unit 111, and the intermediary device 12 includes a request analyzing unit 151 and a communication control unit 152. In more detail, the PC 21B includes the request specifying unit 101, the protocol specifying unit 102, and the priority specifying unit 103, and the server 21A includes the request generating unit 111.

The request specifying unit 101 is a functional unit that specifies a specific request content that is requested by a user in the remote management of the device 11. As the request content, for example, a type of command, the device 11 to be a subject, and the like are included. As the type of command, for example, processing of acquiring (reading) information from the specific device 11, processing of transferring (writing) information in the specific device 11, processing of deleting information in the device, and the like are included. As a method of specifying a request content, for example, a method in which a user operates the input device 57 of the PC 21B to input desired information through a GUI displayed on the display device 56, or the like can be considered.

The protocol specifying unit 102 is a functional unit that specifies a protocol that is used when connection between the intermediary device 12 and the device 11 is to be established. The protocol specifying unit 102 is enabled to specify more than one protocol. A protocol that is specified by the protocol specifying unit 102 can be a general protocol, such as a hyper-text transfer protocol (HTTP), a hyper-text transfer protocol secure (HTTPS), and a file transfer protocol (FTP), or can be a special protocol that is developed for each of the devices 11, and the like. As a method of specifying a protocol, for example, a method in which a user operates the input device 57 of the PC 21B to input desired information through a GUI displayed on the display device 56, or the like can be considered.

The priority specifying unit 103 is a functional unit that specifies priority order of each of the protocols specified by the protocol specifying unit 102. For example, when three protocols, HTTP, HTTPS, and FTP are specified, it gives first priority to HTTP, second priority to HTTPS, and third priority to FTP, or the like. The protocols to which the priority order is thus given are used sequentially in descending order of priority when connection between the intermediary device 12 and the device 11 is to be established. For example, in the above example, connection by HTTP is first tried, and connection by HTTPS is tried if connection by HTTP fails to be established. Furthermore, connection by FTP is tried if connection by HTTPS fails to be established. As a method of specifying priority order, for example, a method in which a user operates the input device 57 of the PC 21B to input desirable information through a GUI displayed on the display device 56 can be considered.

The request generating unit 111 is a functional unit that generates management requests including a request content that is specified by the request specifying unit 101, a type of protocol that is specified by the protocol specifying unit 102, priority order of each protocol that is specified by the priority specifying unit 103. The management request is transmitted to the intermediary device 12 through the firewall 15. The request generating unit 111 of this example is provided in the server 21A, and generates a management request based on information indicating a protocol and priority order specified by a user using the PC 21B. The management request is information that includes a command to make the intermediary device 12 to perform a predetermined function. The management request can include authentication information to pass the firewall 15.

The request analyzing unit 151 is a functional unit that analyzes the management request generated by the request generating unit 111. The intermediary device 12 receives the management request that is transmitted from the management system 21 (server 21A in this example) through the firewall 15. The request analyzing unit 151 extracts information indicating the request content, the type of protocol, the priority order of each protocol, and the like specified by the user from the received management request.

The communication control unit 152 is a functional unit that performs processing to establish connection between the intermediary device 12 and the device 11, processing to implement the request content specified by the user, and the like based on a result of analysis by the request analyzing unit 151. The communication control unit 152 establishes connection between the intermediary device 12 and the device 11 by using protocols in descending order of priority based on the protocols and priority order (specified by the user) included in the management request. That is, the communication control unit 152 first tries to establish connection using a protocol with the highest priority order, and if failing to establish connection, then tries to establish connection using a protocol with the second highest priority order. As described, each time connection fails to be established, protocols are changed in descending order of priority to try establishing the connection. Thus, a success rate for establishing connection between the intermediary device 12 and the device 11 is improved.

Figure 4:
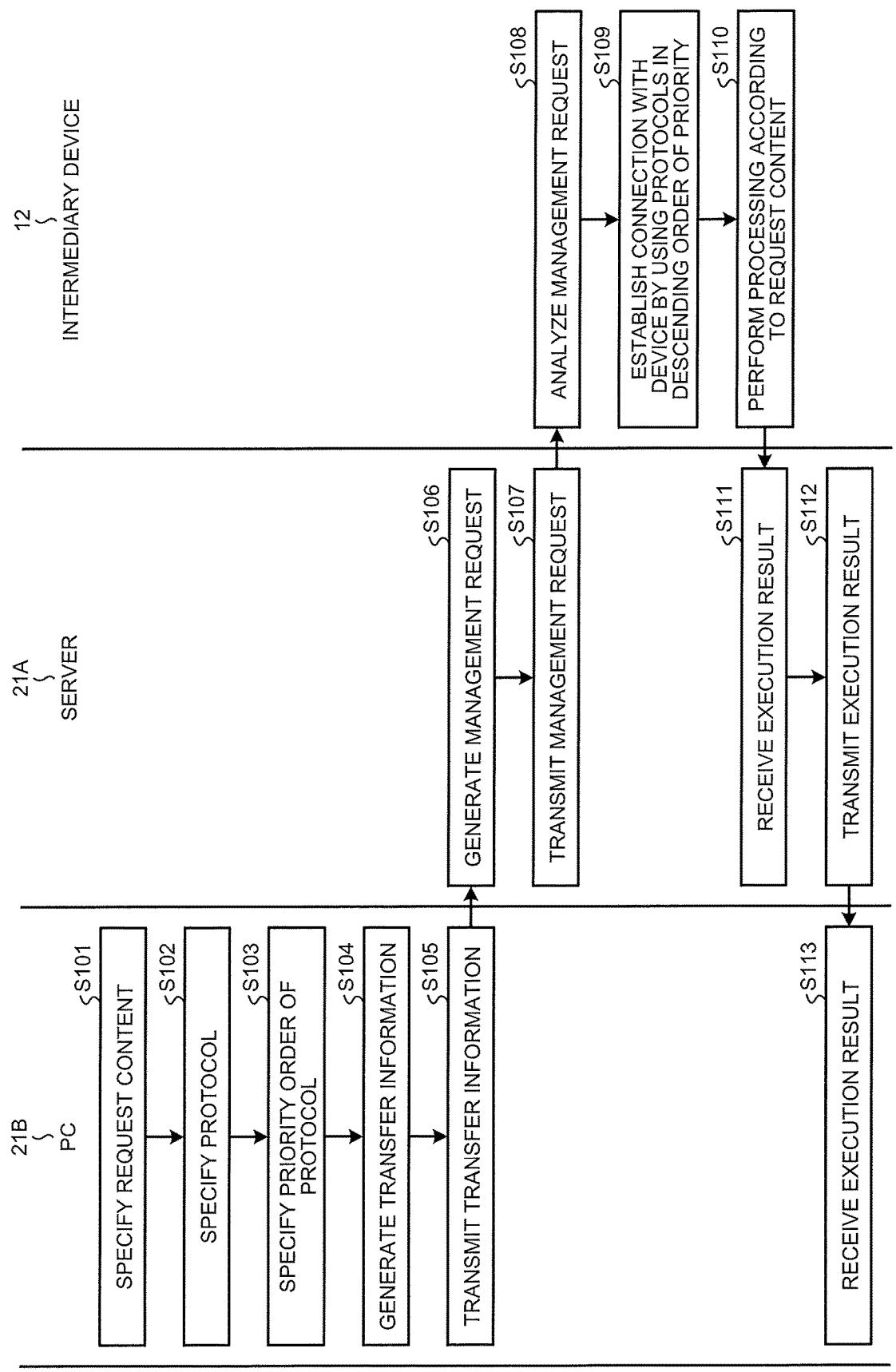
FIG. 4 is a flowchart illustrating a flow of overall processing in the PC, the server, and the intermediary device according to the first embodiment.

FIG. 4 is a flowchart illustrating a flow of overall processing in the PC 21B, the server 21A, and the intermediary device 12 according to the first embodiment. First, the request specifying unit 101 of the PC 21B specifies a request content (S101), the protocol specifying unit 102 specifies at least one protocol (S102), and the priority specifying unit 103 specifies priority order of each of plural protocols (S103). Steps S101 to S103 are performed by a user operating the input device 57 of the PC 21B. Thereafter, the PC 21B generates transfer information that includes the specified request content, protocol, and priority order (S104), and transmits the transfer information to the server 21A (S105).

Figure 5:
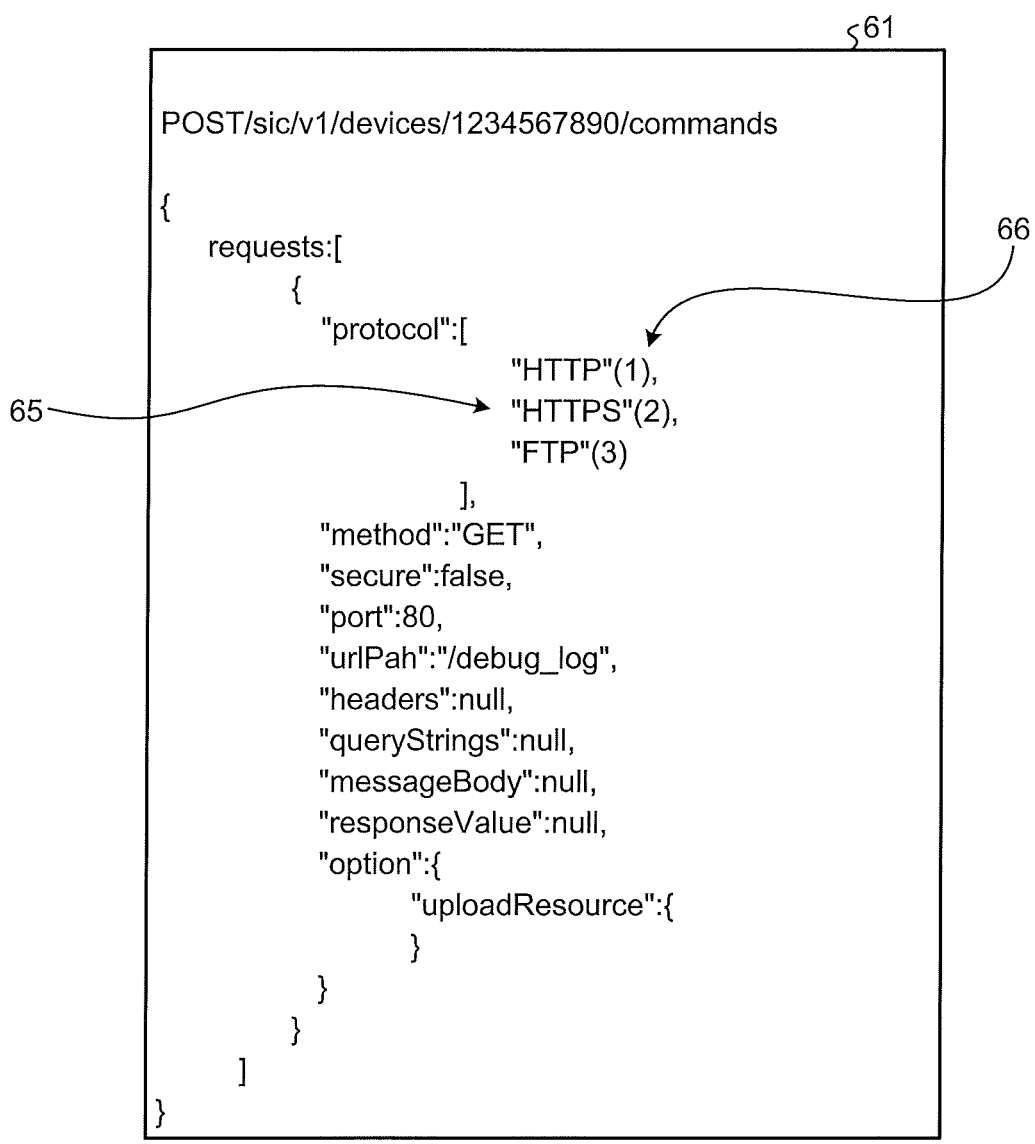
FIG. 5 illustrates transfer information according to a first example of the first embodiment.

FIG. 5 illustrates transfer information 61 according to a first example of the first embodiment. The transfer information 61 is information that is transferred to the intermediary device 12 through the server 21A. The management request generated by the server 12A is generated so as to include the transfer information 61. The transfer information 61 is expressed, for example, as a body of the request. In the example illustrated in FIG. 5, information is specified per request by using a requests key. By making such a specification for multiple times, requests can be issued sequentially.

The transfer information 61 includes a protocol key. The protocol key indicates a protocol 65 that is specified at step S102, and priority order 66 of each protocol that is specified at step S103. In this example, three protocols of HTTP, HTTPS, and FTP are specified, and the first priority (1) is given to HTTP, the second priority (2) is given to HTTPS, and the third priority (3) is given to FTP. Although symbols "(1) to (3)" indicating the priority order are provided in this example, these symbols are not necessarily required. For example, the priority order can be expressed by the alignment sequence of the protocols 65. For example, a higher priority can be given to a protocol that is written at a higher position than a priority of a protocol that is written at a lower position. As described, when more than one protocol 65 is specified, the protocol 65 is used sequentially from the one having the higher priority order 66, and when connection fails to be established, the connection is tried to be established using the next protocol 65. It is thus enabled to establish connection even when the device 11 only allows encrypted communication, for example, and connection by HTTP has failed, by using the other protocol (HTTPS, or the like) 65 for encrypted communication. Moreover, when many of the MFP 11A and the like that use a special protocol are included as objects to be managed, by setting the priority order 66 of the special protocol high, it becomes unnecessary to try connection many times with the MFP 11A.

The transfer information 61 includes a method key. The method key indicates a request content that is specified by the user. The method in the transfer information 61 according to the first example is "GET". "GET" is a command for acquiring a predetermined file (for example, an operation log, and the like) from the device 11. In this example, a method in HTTP is indicated, and PUT, POST, DELETE, and the like can be specified other than GET.

A secure key indicates whether encrypted communication is performed. a port key indicates a port number at transfer. A urlPah key indicates a uniform resource locator (URL) when making a request to the device 11 at transfer. A headers key, a queryStrings key, a messageBody key, a responseValue key indicate a header at making a request, a query, a body, and a response, respectively. when null is specified, a request is made with default configuration. an option key indicates processing or setting other than the above, and can specify, for example, a URL of an upload destination after acquisition of a file, or the like.

Figure 6:
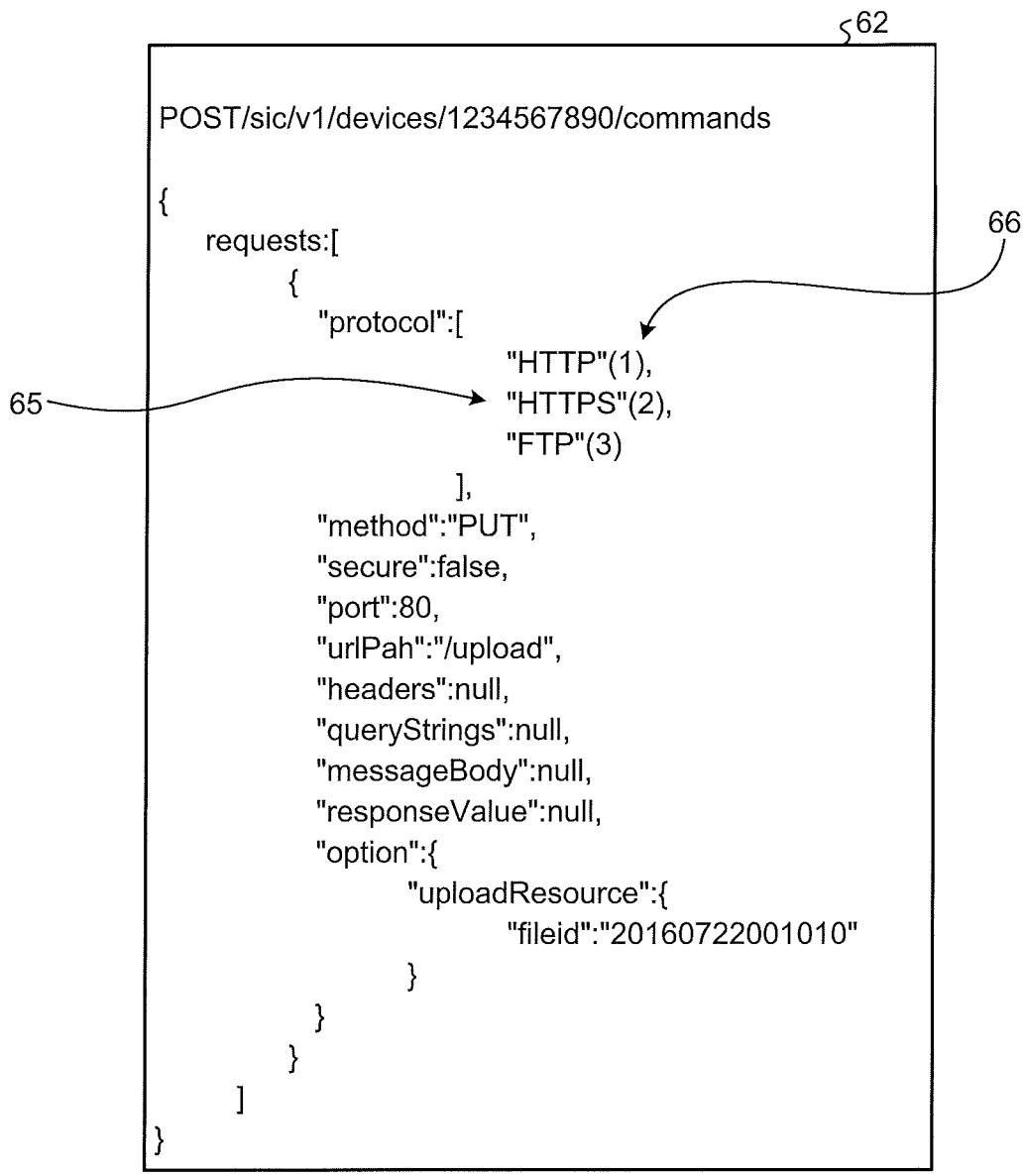
FIG. 6 illustrates transfer information according to a second example of the first embodiment.

FIG. 6 illustrates transfer information 62 according to a second example of the first embodiment. a method in the transfer information 62 according to the second example is "PUT". "PUT" is a command for transferring a predetermined file to the device 11. Also in the transfer information 62 of this example, similarly to the transfer information 61 according to the first example, the protocol key specifies more than one protocol 65 and the priority order 66 of each of the protocols 65. the option key in this example specifies an identification (ID) to be an identifier of a file uploaded to the server 21A.

Referring back to FIG. 4, when the transfer information 61, 62 are transmitted from the PC 21B to the server 21A at step S105, the server 21A generates a management request based on the received transfer information 61, 62 (S106), and transmits the management request to the intermediary device 12 (S107).

FIG. 7 illustrates a management request 71 according to the first example of the first embodiment. The management request 71 according to the first example corresponds to the transfer information 61 according to the first example illustrated in FIG. 5. The management request 71 includes, in addition to the transfer information 61, a command ID, a command type, information to identify the device 11 to be accessed, and the like. To a request key in the management request 71, the transfer information 61 according to the first example transmitted from the PC 21B is substituted, and to an option key, a URL of an upload destination of the file acquired from the device 11 is added.

FIG. 8 illustrates a management request 72 according to the second example of the first embodiment. The management request 72 according to the second example corresponds to the transfer information 62 according to the second example illustrated in FIG. 6. The management request 72 includes, in addition to the transfer information 62, a command ID, a command type, information to identify the device 11 to be accessed, and the like. To a request key in the management request 72, the transfer information 62 according to the second example transmitted from the PC 21B is substituted, and to an option key, a URL of a download destination of the file stored in the storage of the intermediary device 12 is added.

Referring back to FIG. 4, when the management requests 71, 72 are transmitted from the server 21A to the intermediary device 12 at step S107, the request analyzing unit 151 of the intermediary device 12 analyzes the received management requests 71, 72 (S108). In a result of analysis at this time, the request content (GET or PUT in this example) included in the transfer information 61, 62, the protocols 65, and the priority order 66 of each of the protocols 65 are included. Thereafter, the communication control unit 152 establishes connection with the device 11 by using the protocols 65 in descending order of the priority order 66 based on the result of analysis of the management requests 71, 72 (S109), and performs processing according to the request content (GET, PUT, or the like) with respect to the connected device 11 (S110). At this time, the intermediary device 12 generates an intermediation request to be transmitted to the connected device 11 based on the management requests 71, 72 that are transmitted from the server 21A.

Figure 9:
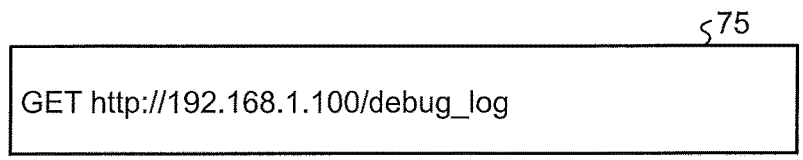
FIG. 9 illustrates an intermediation request according to the first embodiment.

FIG. 9 illustrates an intermediation request 75 according to the first embodiment. The intermediation request 75 according to this example corresponds to the management request 71 according to the first example illustrated in FIG. 7. The intermediation request 75 according to this example indicates that the request content (method) specified by the user is "GET", the protocol to be used (protocol) is "http", and the upload destination (urlPah) of the file is "/debug_log". By specifying a header, a body, a query, a response, and the like, values thereof can also be added to the intermediation request 75. Accesses of the respective devices 11 are managed by the intermediary device 12, and the generated intermediation request 75 is transmitted to the address of the target device 11.

Referring back to FIG. 4, after the processing according to the request is performed between the intermediary device 12 and the device 11, the server 21A receives an execution result of the processing from the intermediary device 12 (S111), and transmits the execution result to the PC 21B (S112). The execution result varies according to the content of the request specified by the user, but it can be, for example, a file acquired from the device 11, a URL to be accessed when downloading the file, a result of transfer of a file, or the like. Thereafter, the PC 21B receives the execution result from the server 21A (S113). The user can check the execution result through the display device 56 of the PC 21B.

Figure 10:
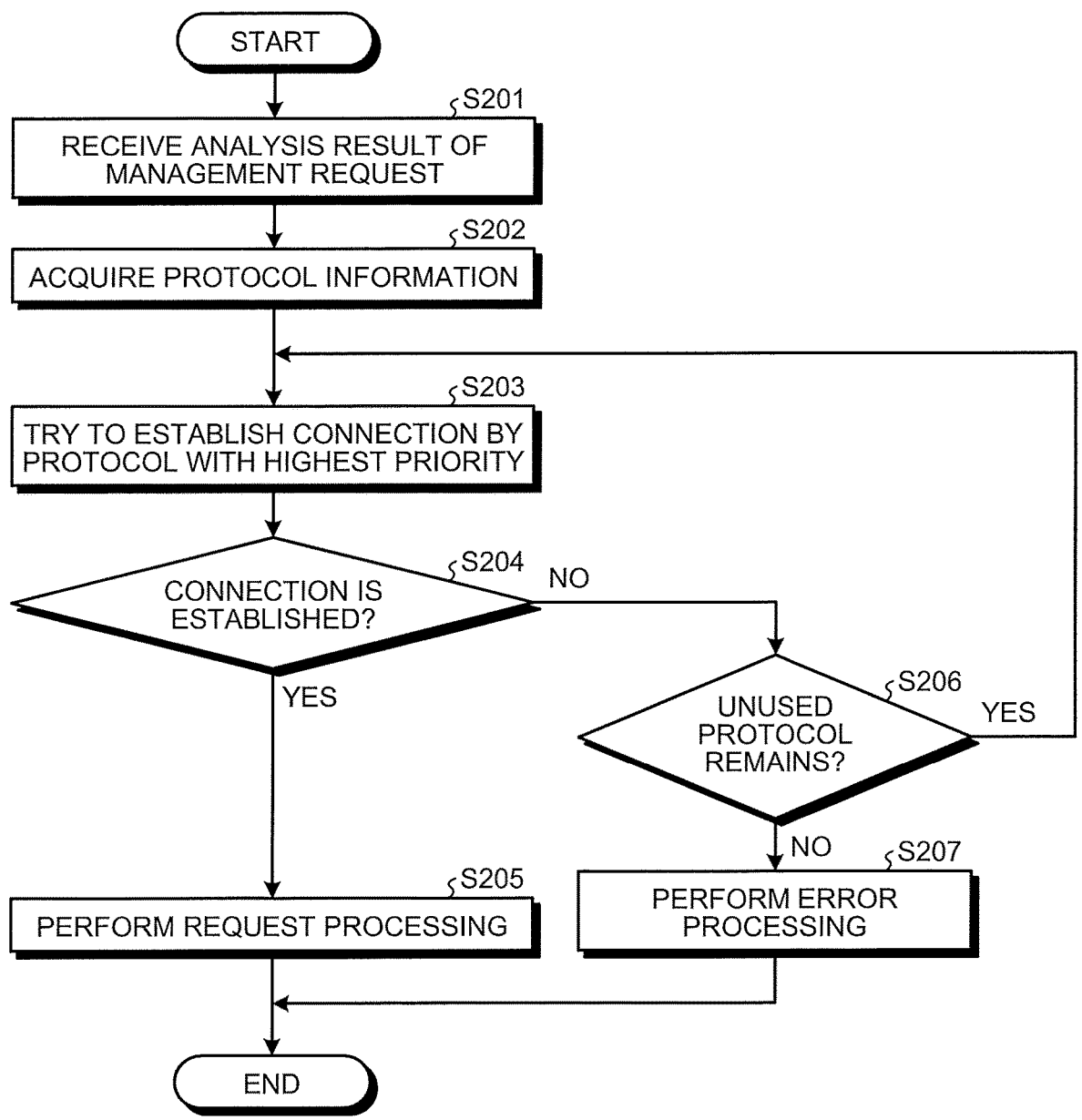
FIG. 10 is a flowchart illustrating processing that is performed when connection between the intermediary device and a device according to the first embodiment is established.

FIG. 10 is a flowchart illustrating processing that is performed when connection between the intermediary device 12 and the device 11 according to the first embodiment is established. First, the communication control unit 152 receives the result of analysis by the request analyzing unit 151 (S201), and acquires information (protocol information) that indicates the protocols 65 and the priority order 66 of each of the protocols 65 specified by the user based on the result of analysis (S202). Thereafter, the communication control unit 152 tries to establish connection with the device 11 using the protocol 65 with the highest priority order 66 among the protocols 65 (S203). When the connection is established (S204: YES), the communication control unit 152 performs processing according to the request content specified by the user (S205). On the other hand, when the connection is not established (S204: NO), the communication control unit 152 determines whether there is the protocol 65 that has not been used (S206). When there is the protocol 65 that has not been used (S206: YES), the communication control unit 152 tries to establish connection with the device 11 using the protocol 65 with the highest priority order 66 among the protocols 65 that have not been used (S203). On the other hand, when there is not the protocol that has not been used (S206: NO), the communication control unit 152 performs error processing to inform the server 21A that the connection cannot be established (S207).

Figure 11:
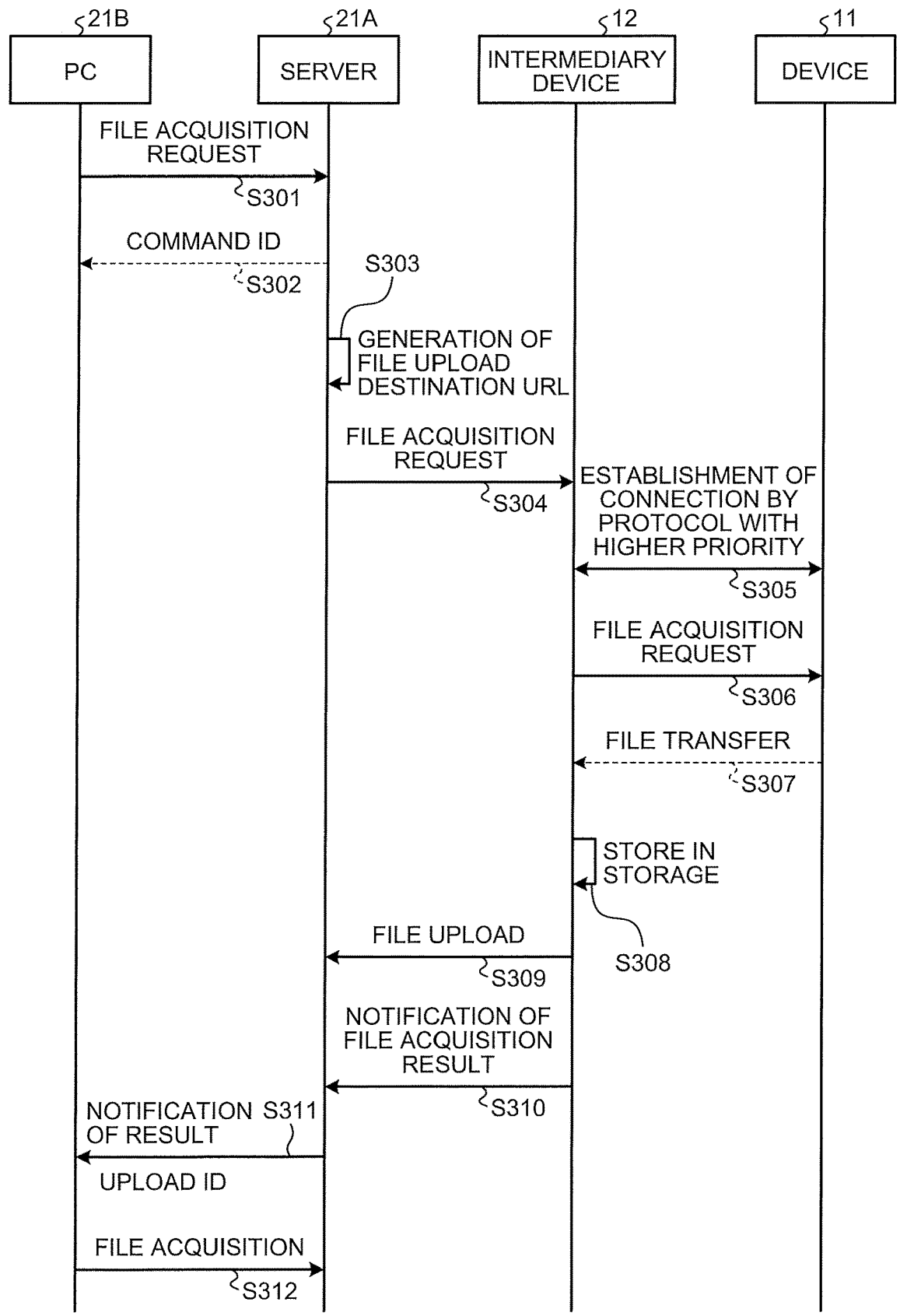
FIG. 11 is a flowchart illustrating a flow of processing that is performed when a file is acquired from a device in the remote management system according to the first embodiment.

FIG. 11 is a flowchart illustrating a flow of processing (GET) that is performed when a file is acquired from the device 11 in the remote management system 1 according to the first embodiment. That is, processing that is performed according to the management request 71 (the transfer information 61 according to the first example illustrated in FIG. 5) according to the first example illustrated in FIG. 7 is explained herein.

First, the PC 21B requests acquisition of a file, such as an operation log, that is stored in the device 11 to the server 21A (cloud application) (S301). At this time, the request content (GET), the protocols 65, the priority order 66, information to identify the target device 11, the authentication information, and the like to the server 21A. The server 21A transmits a command ID to the PC 21B as a response to the file acquisition request (S302).

Thereafter, the server 21A generates a URL of an upload destination of the file (S303), and requests acquisition of the file to the intermediary device 12 (S304). At this time, the server 21A transmits the management request 71 in which the URL of the upload destination is added to the transfer information 61 received from the PC 21B, to the intermediary device 12.

Thereafter, the intermediary device 12 establish connection with the device 11 by using the protocol 65 with the highest priority order 66 based on the management request 71 (the transfer information) received from the server 21A (S305), and requests acquisition of the file to the device 11 (S306). The device 11 transfers the file to the intermediary device 12 according to a request from the intermediary device 12 (S307). The intermediary device 12 stores the file transferred from the device 11 in a storage in the own device (S308), and uploads the file to the URL specified by the server 21A (S309), and transmits a notification of a file acquisition result to the server 21A (S310). The notification of a file acquisition result includes a list indicating success/fail of acquisition of file per device 11.

Thereafter, the server 21A transmits the notification of a file acquisition result and an upload ID to the PC 21B (S311). The upload ID includes the URL of the upload destination from the intermediary device 12 of the file, and the like. Thereafter, the user accesses the URL indicated by the upload ID by operating the PC 21B, and acquires (downloads) the file (S312).

Figure 12:
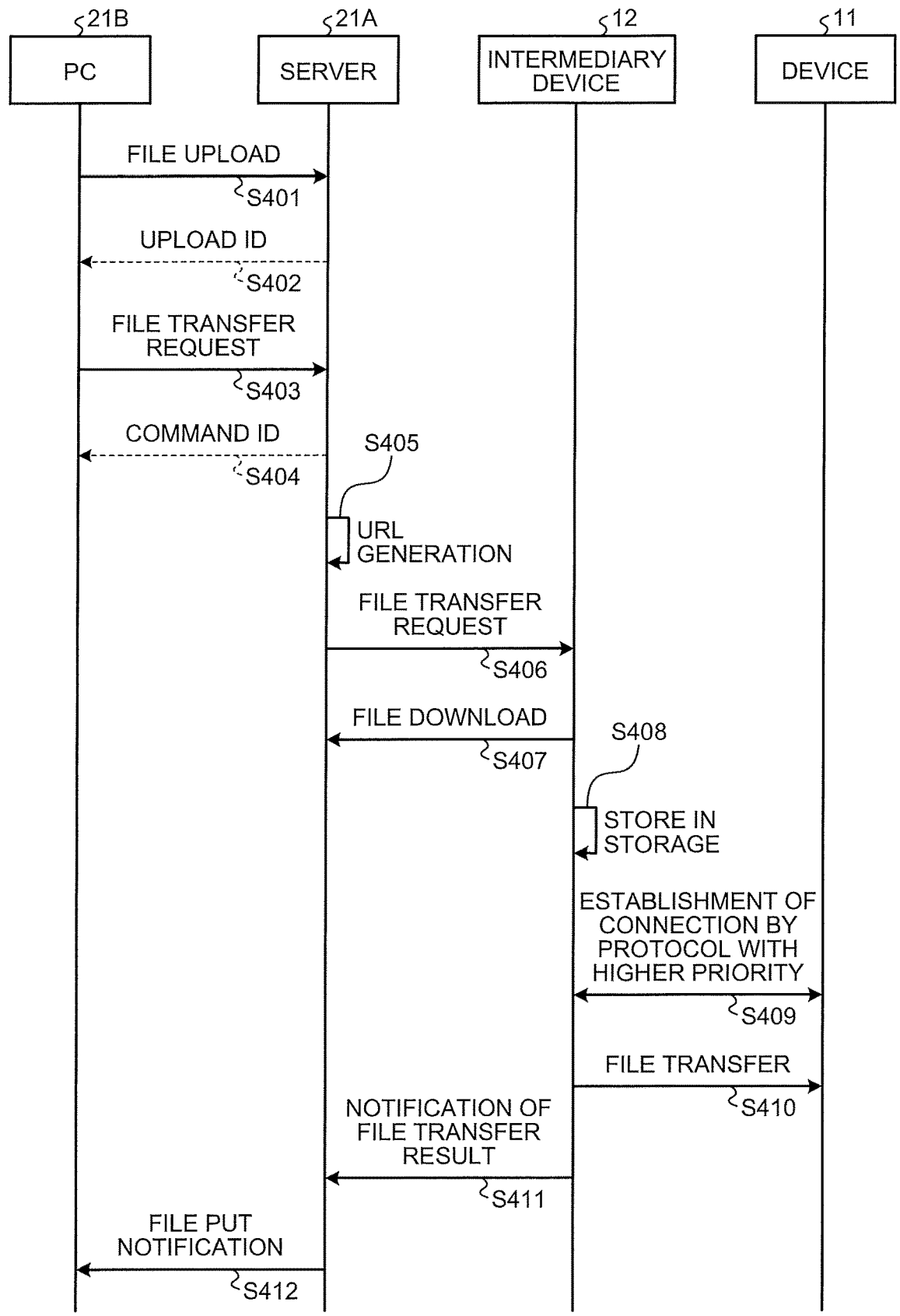
FIG. 12 is a flowchart illustrating a flow of processing that is performed when a file is transferred to a device in the remote management system according to the first embodiment.

FIG. 12 is a flowchart illustrating a flow of processing (PUT) that is performed when a file is transferred to the device 11 in the remote management system 1 according to the first embodiment. That is, processing that is performed according to the management request 72 (the transfer information 62 according to the second example illustrated in FIG. 6) according to the second example illustrated in FIG. 8 is explained herein.

First, the user operates the PC 21B and uploads, to the server 21A, a file wished to be transferred (S401). The server 21A that has accepted the upload transmits the upload ID to the PC 21B (S402). Thereafter, when the user operates the PC 21B to request file transfer (S403), the server 21A transmits the command ID to the PC 21B as a response to the file transfer request (S404).

Thereafter, the server 21A generates a URL for file download (S405), and request file transfer to the intermediary device 12 (S406). At this time, the server 21A transmits the management request 72 in which the URL of the download destination is added to the transfer information 62 received from the PC 21B to the intermediary device 12. The intermediary device 12 accesses the received URL and downloads the file uploaded to the server 21A (S407), and stores the file in a storage in the own device (S408).

Thereafter, the intermediary device 12 establishes connection with the device 11 by using the protocol 65 with the highest priority order 66 based on the management request 72 (the transfer information 62) received from the server 21A (S409), and transfers the file stored in the storage to the device 11 (S410).

Thereafter, the intermediary device 12 transmits a notification of a file transfer result to the server 21A (S411). The notification of a file transfer result includes a list indicating success/fail of file transfer per device 11. The server 21A that has received the notification of a file transfer result transmits a file PUT notification that indicates a result of file transfer to the PC 21B (S412).

A program that implements the intermediary device 12, the server 21A, or the PC 21B is recorded in a computer-readable recording medium, such as a compact disk (CD)-read-only memory (ROM), a flexible disk (FD), a CD-recordable (CD-R), and a digital versatile disk (DVD), in a file of a format enabling to be installed or executed therein to be provided.

The program can be stored in a computer connected to a network such as the Internet 23, and be provided by being downloaded through the network by the intermediary device 12, the server 21A, or the PC 21B. Moreover, the program can be provided or distributed through a network. Furthermore, the program can be installed in the HDD 52 or the like of the server 21A or the PC 21B in advance to be provided. The program can have a module structure including each functional unit (the request specifying unit 101, the protocol specifying unit 102, the priority specifying unit 103, the request generating unit 111, the request analyzing unit 151, or the communication control unit 152).

According to the remote management system 1 described above, the multiple protocols 65 are sequentially tried to establish connection between the intermediary device 12 and the device 11 according to the priority order 66. Thus, even when connection fails to be established by one protocol, connection can be established by the other protocol. This enables to improve the success rate in establishing connection between the intermediary device 12 and the device 11, and to improve the stability of the remote management system 1.

In the above first embodiment, an environment such as an office in which the MFP 11A, the projector 11B, the electronic whiteboard 11C, and the like are used is assumed as an environment in which the remote management system 1 is used. However, the range of application of the remote management system according to the present invention is not limited such an environment. The remote management system according to the present invention is applicable to various kinds of environment. In the following, a remote management system that is used in other environments is explained. In following other embodiments, common reference symbols are assigned to parts identical or similar to those of the first embodiment, and explanation thereof might be omitted.

Second Embodiment

Figure 13:
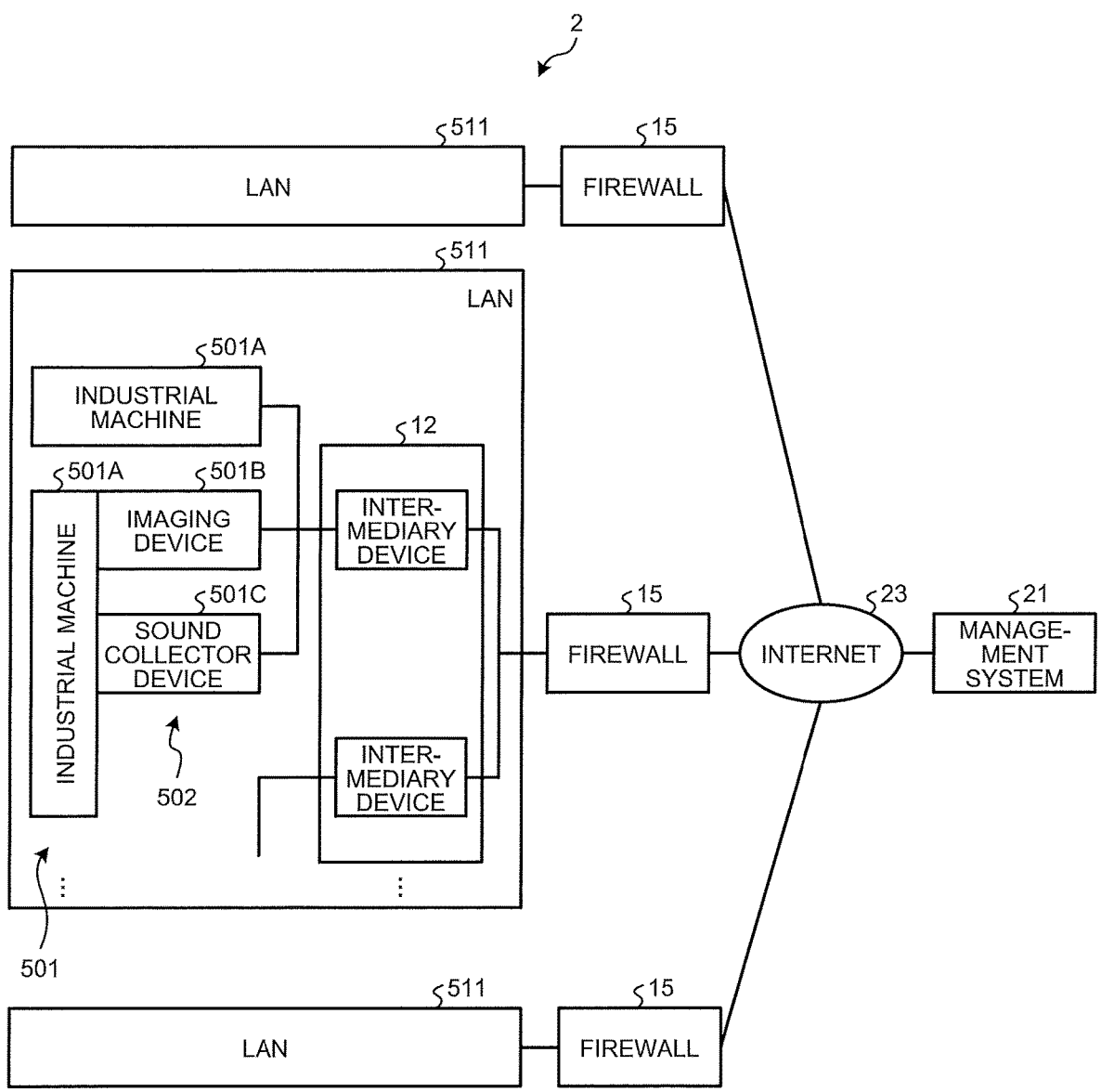
FIG. 13 illustrates a configuration of a remote management system according to a second embodiment.

FIG. 13 illustrates a configuration of a remote management system 2 according to a second embodiment. The remote management system 2 according to the present embodiment is used in a production facility such as a factory.

The remote management system 2 according to the present embodiment includes a device 501 (industrial machine 501A, an imaging device 501B, and a sound collector derive 501C), the intermediary device 12, the firewall 15, the Internet 23, and the management system 21. The device 501 that is remote managed in the present embodiment includes the industrial machine 501A, the imaging device 501B, and the sound collector device 501C. The imaging device 501B and the sound collector device 501C are mounted on the industrial machine 501A itself or peripheral equipment, and functions as a sensor 502 that acquires information about the industrial machine 501A. The industrial machine 501A, the sensor 502 (the imaging device 501B and the sound collector device 501C), and the intermediary device 12 are connected to a LAN 511 that is protected by the firewall 15. The intermediary device 12 in the LAN 511 is connected to the management system 21 through the Internet 23. The LAN 511 (the firewall 15) and the intermediary device 12 can be provided in plurality. Moreover, more than one intermediary device 12 can be provided in the one LAN 511.

As described above, the remote management system 2 according to the present embodiment enables remote management of the device 501 that is used in production facility such as a factory. Thus, the range of application of the remote management system according to the present invention is not limited to an environment such as an office explained in the first embodiment.

Third Embodiment

Figure 14:
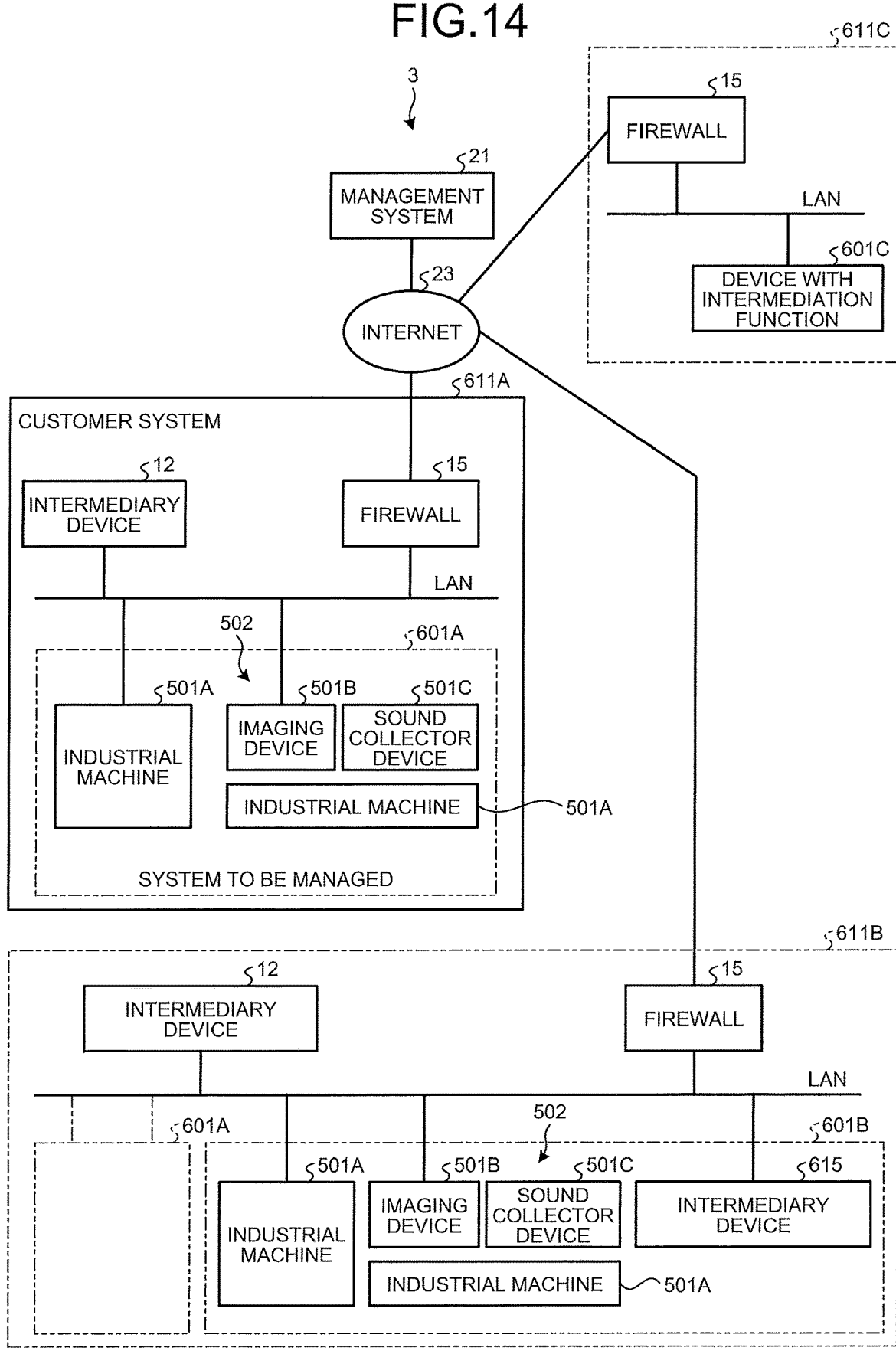
FIG. 14 illustrates a configuration of a remote management system according to a third embodiment.

FIG. 14 illustrates a configuration of a remote management system 3 according to a third embodiment. The remote management system 3 according to the present embodiment is used in an environment in which multiple customer systems 611A, 611B, 611C having different forms from each other are present. The management system 21 remote manages a device (systems 601A, 601B to be managed and a device with intermediation function 601C) included in the respective customer systems 611A, 611B, 611C that are protected by the firewall 15.

The customer systems 611A, 611B, 611C are systems that are installed at customer sites. The intermediary device 12 in the first customer system 611A is connected to the system 601A to be managed and the firewall 15 by a LAN. The system 601A to be managed includes multiple industrial machines 501A, such as a processor, conveyer, and a tester, the sensor 502 (the imaging device 501B and the sound collector device 501C), and the like. The intermediary device 12 can have a firmware updating unit that updates, through the Internet 23, firmware of the respective devices 501A, 502 in the system 601A to be managed in addition to the functional units (the request analyzing unit 151, the communication control unit 152, and the like) explained in the first embodiment.

The customer system 611B is a system that is installed at another customer site. The intermediary device 12 in the customer system 611B is connected to the multiple systems 601B to be managed and the firewall 15 by a LAN. One of the management subject system 601B includes the multiple industrial machines 501A, such as a processor, a conveyer, and a tester, the sensor 502, and the like. The intermediary device 12 can have a firmware updating unit that updates, through the Internet 23, firmware of the respective devices 501A, 502 in the system 601B to be managed in addition to the functional units (the request analyzing unit 151, the communication control unit 152, and the like) explained in the first embodiment.

Although the example in FIG. 14 illustrates a configuration in which the system 601A to be managed includes the industrial machine 501A and the sensor 502, it is not limited to this configuration. In the customer system 611B, as a load is heavy with only one unit of the intermediary device 12, an intermediary device 615 having a firmware updating unit is provided in the management subject system 601B.

The customer system 611 C is a system that is installed in still another customer site. In the customer system 611C, the device with intermediation function 601C is connected to the firewall 15 by a LAN. The device with intermediation function 601C is the industrial machine 501A or the sensor 502 having a similar function as the intermediary device 12.

As described above, the customer systems 611A, 611B, 611C inside of the firewall 15 are connected to the external management system 21 through the Internet 23. The management system 21 remote controls the respective devices (the industrial machine 501A, the sensor 502 (the imaging device 501B and the sound collector device 501C), the device with intermediation function 601C) in the customer systems 611A, 611B, 611C through the Internet 23.

As described above, the remote management system 3 according to the present embodiment is used in an environment in which various kinds of the customer systems 611A, 611B, 611C are present. Thus, the range of application of the remote management system according to the present invention is not limited to environments such as an office and a production facility having a single form.

As described above, the remote management system according to the present invention is used in various environments, and is enabled to handle various kinds of devices as management targets. A device that can be managed thereby includes office equipment, a network home appliance, an automatic vending machine, a medical device, an industrial machine, a power source device, an air conditioning system, or a meter system for gas, water, electricity, or the like to which a communication function is given. The industrial machine can be a processing device, a testing device, a conveying device, a picking device, and the like. The medical device can be a fundus examination device, an X-ray examination device, a sphygmomanometer, a bodyfat analyzer, an optometer, a pacemaker, and the like. Moreover, a sensor or the like that is installed on the periphery of these devices to monitor the condition of the devices can also be managed. A device to be managed stores identification information, information indicating about an operating state, information relating to an abnormal action, information relating to replacement timing of a consumable item, information indicating a test result, and the like, and the management system 21 performs management processing, such as acquisition, transfer, update, and deletion, of such information.

According to the present invention, it is possible to improve the stability of a remote management system.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A remote management system, comprising:
   a management system that remotely manages a device through an intermediary device; and
   the intermediary device, wherein the intermediary device and the device are included in a first network that is protected by a firewall, and the management system is included in a second network that is outside of the firewall,
   wherein the management system includes processing circuitry configured to specify a command indicating a task to be executed using the device;

specify a plurality of protocols to establish connection between the intermediary device and the device to accomplish the task;

specify a priority order of the plurality of the protocols;

generate a request including each of the command, the plurality of protocols, and the priority order; and transmit, unsolicited, the request through the firewall to the intermediary device, and the intermediary device includes circuitry configured to receive the command, the plurality of protocols, and the priority order, and establish a connection between the intermediary device and the device by using one of the plurality of received protocols included in the request, in descending order of the priority order, and perform processing in conjunction with the device according to the command to accomplish the task.

2. The remote management system according to claim 1, wherein the management system includes a server configured to transmit the request to the intermediary device through the firewall; and an information processing terminal configured to connect to the server inside the second network, and the information processing terminal includes the processing circuitry.

3. The remote management system according to claim 1, wherein the intermediary device performs the processing to cause the management system to acquire information that is stored in the device.

4. The remote management system according to claim 1, wherein the intermediary device performs the processing to transfer information that is input to the management system to the device.

5. The remote management system of claim 1, wherein the management system remotely manages the device, which is one of an image handling device and an industrial machine.

6. The remote management system of claim 1, wherein the circuitry of the intermediary device is further configured to attempt to establish the connection with a particular protocol of the plurality of protocols having a second priority when an attempt to establish the connection with a protocol of the plurality of protocols having a highest priority fails.

7. The remote management system of claim 1, wherein the intermediary device relays information from the management system to the device.

8. An intermediary device configured to perform processing to implement intermediation of remote management of a device by a management system, wherein the intermediary device and the device are included in a first network that is protected by a firewall, and the management system is included in a second network that is outside of the firewall, wherein the intermediary device includes circuitry configured to receive, unsolicited through the firewall, a request that includes a command indicating a task to be executed by the device, and information indicating a plurality of protocols and information indicating a priority order of the plurality of protocols from the management system, receive the plurality of protocols and the priority order, and establish a connection between the intermediary device and the device by using one of the plurality of protocols that are specified by the request, in descending order of the priority order, and perform processing in conjunction with the device according to the command to accomplish the task.

9. A remote management method in which a management system remote manages a device through an intermediary device, wherein the intermediary device and the device are included in a first network that is protected by a firewall, and the management system is included in a second network that is outside of the firewall, the method comprising:

specifying a command indicating a task to be executed by the device;

specifying a plurality of protocols to establish connection between the intermediary device and the device to accomplish the task;

specifying a priority order of the plurality of protocols;

generating a request including each of the command, the plurality of protocols, and the priority order;

transmitting, unsolicited, the request through the firewall to the intermediate device;

receiving the command, the plurality of protocols, and the priority order; and establishing connection between the intermediary device and the device by using one of the plurality of protocols included in the request in descending order of the priority order, and performing processing in conjunction with the device according to the command to accomplish the task.

* * * * *